United States Patent [19]

Hara et al.

[11] Patent Number: 4,460,697

[45] Date of Patent: Jul. 17, 1984

[54] PROCESS FOR PRODUCING NON-OXIDE POWDERS

[75] Inventors: Hisao Hara; Hirohide Yamada, both of Kumagaya, Japan

[73] Assignee: Hitachi Metals, Ltd., Tokyo, Japan

[21] Appl. No.: 380,780

[22] Filed: May 21, 1982

[30] Foreign Application Priority Data

May 22, 1981 [JP] Japan ................................. 56-77818

[51] Int. Cl.³ ........................ C04B 35/56; C04B 35/58
[52] U.S. Cl. ....................................... 501/87; 423/297; 423/345; 423/409; 423/411; 423/440; 501/88; 501/91; 501/92; 501/93; 501/96; 501/97
[58] Field of Search ...................... 501/87, 88, 91, 92, 501/93, 96, 97; 423/297, 345, 409, 411, 440

[56] References Cited

U.S. PATENT DOCUMENTS 3,716,627  2/1973  Middelhoek ......................... 501/87
3,932,594  1/1976  Gortsema ............................ 423/440

Primary Examiner—James Poer
Attorney, Agent, or Firm—Antonelli, Terry & Wands

[57] ABSTRACT

Non-oxide powders such as carbides, nitrides, carbides/nitrides and borides are obtained by reducing an oxide powder in a reducing atmosphere, and after or concurrently with the reduction, treating the reduced powder in a carbonizing atmosphere, a nitrogenizing atmosphere, a carbonizing and nitrogenizing atmosphere, or a boronizing atmosphere. As the above oxide powder, there is used a brittle material obtained by rapid cooling of a melted oxide. The non-oxide powders obtained are utilized as a hard component of cemented carbides and cermet. These powders are fine particles having a particle size of 1.0 μm or smaller and a high purity.

15 Claims, No Drawings

PROCESS FOR PRODUCING NON-OXIDE POWDERS

FIELD OF THE INVENTION

This invention relates to a process for producing non-oxide powders, particularly carbides which are utilized as a hard component of cemented carbides and cermet.

DESCRIPTION OF THE PRIOR ART

As general processes for producing carbides, there are known (1) a solid phase reaction between a metal power and carbon, (2) a solid phase-gas phase reaction between a metal powder and a gaseous carbon-containing substance, (3) menstruum process, (4) a reaction between a halide and a hydrocarbon, and so forth. In these conventional processes, however, there exist various problems. In the above process (1), preparation of a carbide having a particle size of 1 $\mu$m or smaller without any impurity contamination is difficult even by means of mechanical grinding, because the reaction is carried out at high temperatures, the particle size of the synthesized powder is influenced by the size of solid carbon, and impurity contamination from solid carbon is unavoidable. Nevertheless, WC which is a main raw material of cemented carbides is produced most generally by this process. It is because, in this process, the control of particle size of the synthesized WC powder is easy and the ratio of combined carbon is high.

In the process (2) which is used, for instance, for the synthesis of WC powder by the reaction between W powder and $CH_4$ gas, the carbonizing speed is slow, and moreover, the size of the synthesized particles is affected by the size of the metal powder.

In the process (3), the obtainment of fine powder is difficult, because the reaction is required to be conducted at high temperatures and the particles obtained are single crystals of a larger size of about 100 $\mu$m.

In the process (4), the powder of fine sizes of several hundred Å and having a high purity is obtained. However, a particle size of about 0.1 to 10 $\mu$m are suitable for raw materials for cemented carbides of industrial application, and accordingly, particle sizes of several hundred Å have little industrial merits.

SUMMARY OF THE INVENTION

This invention is intended to provide a novel production process of non-oxide powders which solves defects of the conventional technologies, excels in mass production and further enables the production of fine particles having a size of 1.0 $\mu$m or smaller size.

In the process of this invention, an oxide powder is reduced in a reducing atmosphere, and after the reduction or concurrently with the reduction, the reduced powder is treated in a carbonizing, nitrogenizing, carbonizing/nitrogenizing, or boronizing atmosphere to obtain a non-oxide such as carbide, nitride, carbide/nitride, or boride.

DETAILED DESCRIPTION OF PREFERRED EMBODIMENTS

In the process of this invention, by the use of an oxide firstly melted and then rapidly cooled, powder having a more conspicuous feature is obtained. Also, when a gas phase put in a plasma condition is employed, the reaction is highly activated, resulting in the synthesis of a powder of a fine particle size.

When WC is synthesized from $WO_3$, $H_2$ is preferable as a reducing gas and $CH_4$ is preferable as a carbonizing gas. In this case, a sufficiently desirable powder is synthesized if the ratio of $H_2/CH_4$ is in the range of 1/10 to 100/1. When the ratio is smaller than 1/10, the reducing reaction does not proceed sufficiently, and when the ratio is larger than 100/1, the carbonizing speed becomes slow, which is not preferable industrially. When the reaction is conducted in a gas phase in a plasma condition, a reduced pressure of 0.1 to 20 Torr is required. Under pressures outside this range, the generation of the plasma is difficult. In the synthesis of WC from $WO_3$, a temperature of 800° C. or higher is necessary. When the temperature is lower than 800° C., the reduction does not proceed sufficiently. It was confirmed by experiments that, when $WO_3$ contained oxides, other compounds and metal powders of Cr and V, a synthesis temperature of at least 1100° C. or higher was necessary. It was also confirmed by experiments that, when $WO_3$ was mixed with Mo metal, a Mo oxide or another Mo compound, heating to 1400° C. or higher was necessary in order to obtain a carbide of hexagonal solid solution.

All of the reactions according to this invention are solid phase-gas phase reactions. Accordingly, for instance, in the synthesis of WC, a product of very high purity is obtained. Also, when a mixed gas for reduction and carbonization put in a plasma condition is used for reaction, it has been found that reactions such as carbonization, nitrogenization and boronization proceeded better than in conventional processes. Accordingly, it was confirmed that the synthesis temperature can be lowered, the combining ratio of carbon, nitrogen or boron in the synthesized powder can be increased, and as a result, a uniform powder having a finer particle size can be produced. Also, the inventors have found that, when WC is synthesized in the above-mentioned process after $WO_3$ has been cooled at a speed of $10^{4°}$ C./sec or faster, the reaction of $WO_3$ with the gas phase is activated much more compared with the case where a commercial $WO_3$ powder is carbonized. This is presumed to be perhaps due to that a large quantity of strain energy accumulated in $WO_3$ by rapid cooling contributes to its reaction with the gas phase. Anyhow, by the use of rapidly cooled $WO_3$, WC having an average particle size of about 0.3 $\mu$m which has been so far difficult to produce can be produced easily. Furthermore, by using a reaction atmosphere of a plasma condition, the reaction is more activated and the production of a powder having an average particle size of even about 0.1$\mu$ becomes possible.

When the cooling speed is slower than $10^{4°}$ C./sec, the accumulated strain energy becomes less and the above-mentioned effect becomes smaller.

The adoption of a step of melting and rapid cooling in the production of WC dissolving Cr, V and Mo, brings about, in addition to the above effect by rapid cooling, another effect that Cr, V and Mo are dissolved uniformly owing to the melting.

The foregoing explains a process for producing non-oxide powders from oxides as a starting material, but a hydride may be used as a starting material. Generally, the dehydrogenation of the hydride should be carried out at a high temperature and such dehydrogenation is an exothermic reaction, therefore, the reaction temperature becomes undesirably higher. Thus, the hydride has never been used as a starting material. However, bringing the reaction gas into a plasma condition according to this invention allows the hydride to be used, because the higher energy of electrons in the plasma condition causes the hydride to be very highly reactive in spite of lower reaction temperatures.

This invention will be explained below with reference to some examples.

EXAMPLE 1

Into a quartz tube of which one end was tapered in the shape of a nozzle, there was charged a $WO_3$ powder. The tube was placed in a furnace heated to 1480° C. After having been retained for 5 min. in the furnace, the tube was rapidly moved downward out of the furnace, and simultaneously argon gas having a pressure of 2.5 kg/cm$^2$ was introduced into the quartz tube to gush the melted $WO_3$ from the tapered end of the tube. The gushed $WO_3$ was collided with a copper-made revolving body having an outside diameter of 300 mm and revolving at a circumference speed of 30 m/sec which was positioned so that the uppermost portion of the revolving body came 2 mm right under the tapered end of the quartz tube. By the collision, the $WO_3$ was rapidly cooled and a thin-layered $WO_3$ was obtained. Subsequently, this rapidly cooled, thin-layered $WO_3$ was placed in an atmosphere of a mixed gas consisting of $H_2$ and $CH_4$ (1:1) heated to 1000° C. and retained for 1 hour. After cooling, the synthesized powder was taken out. The X-ray diffraction confirmed that this synthesized powder was WC. Carbon analysis showed that the amount of combined carbon was 6.13% by weight. Also, scanning electron microscope analysis revealed that the synthesized powder had an average particle size of 0.4 μm.

EXAMPLE 2

A rapidly cooled, thin-layered $WO_3$ prepared by a procedure essentially same as that of Example 1 was charged into a carbon container, and then the container was placed in an atmosphere of a mixed gas consisting of $H_2$ and $CH_4$ (2:1). The pressure in the atmosphere was 10 Torr. High-frequency heating was externally applied to heat the carbon container to 800° C. and also to convert the mixed gas of $H_2$ and $CH_4$ into a plasma condition. This state was retained for 1 hour to cause the reduction reaction and the carbonization reaction to proceed sufficiently, after which the high-frequency heating was terminated. It was confirmed by analyses that the synthesized powder was WC, the amount of combined carbon was 6.14% by weight and the average particle size of the powder was about 0.1 μm.

EXAMPLE 3

A commercial $WO_3$ powder was retained for 1 hour in an atmosphere similarly to Example 2, to conduct the reduction and carbonization treatment. The retention temperature was 1000° C. The X-ray diffraction showed that the synthesized powder was WC. Furthermore, by the use of ICP (inductively coupled plasma spectrophotometer), component analysis was conducted for the above synthesized powder and also for a commercial WC as comparative product. The followings are part of the measurement data.

| Powder | S (ppm) | O (ppm) | Fe (%) | Na (ppm) |
|---|---|---|---|---|
| Commercial WC | 70 | 4200 | 0.12 | 20 |
| WC according to this invention | 0.5 | 450 | 0.002 | 3 |

From the above it is learned that the WC synthesized from the gas phase reaction has a very high purity. It should be particularly noted that sulfur provides adverse affects when WC is used as a raw material of cemented carbides is extremely low in the WC produced according to this invention.

EXAMPLE 4

A rapidly cooled, thin-layered $WO_3$ produced is essentially the same procedure as that of Example 1 was mixed with powder carbon. The mixture was heated for 1 hour at 1400° C. in $N_2$ atmosphere, and then heated for 1 hour at 1600° C. in $H_2$ atmosphere.

Analysis by scanning electron microscope revealed that the synthesized WC powder was a very fine powder having an average particle size of 0.4 μm.

EXAMPLE 5

A rapidly cooled, thin-layered $WO_3$ produced by essentially the same procedure as that of Example 1 was ground into a powder with a disc-type vibration mill. Then, the powder was transferred into a carbon container, subjected to reduction treatment by retaining the container for 1 hour at 800° C. in $H_2$ atmosphere, and subjected to carbonization treatment by retaining for 1 hour at 900° C. in $CH_4$ atmosphere. Analysis by scanning electron microscope showed that the synthesized powder was much finer than commercial WC and had a narrower distribution of particle size. The powder had an average particle size of about 0.4 μm.

EXAMPLE 6

$WO_3$ was mixed with 0.4% by weight of $Cr_2O_3$, and by essentially the same procedure as that of Example 1 a rapidly cooled, thin-layered oxide was produced. The oxide was transferred to a carbon container and placed in an atmosphere of a mixed gas consisting of $H_2$ and $CH_4$ (1:2). The atmosphere had a pressure of 0.7 Torr. High-frequency heating was externally applied to heat the carbon container to 1100° C. and also to convert the mixed gas of $H_2$ and $CH_4$ into a plasma condition. This state was retained for 1 hour to cause the reduction reaction and the carbonization reaction to proceed sufficiently, and then the reaction system was cooled.

Analysis by ICP and X-ray diffraction indicated that the synthesized powder was a WC containing Cr. Also, analysis by SEM (scanning electron microscope) showed that this powder had an average particle size of about 0.2 μm.

Using the above synthesized powder, cemented carbide having a composition of WC-12% Cr was produced. In the production, wet mixing together with 1% by weight of paraffin wax in a ball mill was employed, and after drying, a pressed body was prepared. The body was sintered in vacuum for 1 hour at 1375° C.

The sintered body had a very uniform structure and an average particle size of 0.25 μm. As long as observation by SEM showed, there was not even a gigantic WC particle grown abnormally.

EXAMPLE 7

WO₃ was mixed with 1% by weight of $V_2O_5$, and by essentially the same procedure as that of Example 1, a rapidly cooled, thin-layered oxide was produced. In the production, different from Example 1, the melting was conducted for 1 hour at 1500° C. The rapidly cooled, thin-layered oxide was subjected to reduction and carbonization treatments in the same atmosphere as that in Example 1, but at 1300° C. Analysis by X-ray diffraction and ICP indicated that the synthesized powder was a V-containing WC. Also, observation by SEM showed that the powder had an average particle size of 0.3 μm.

EXAMPLE 8

Using an oxide mixture of 50% by weight of WO₃ and 50% by weight of MoO₃ and by essentially the same procedure as that of Example 1, a rapidly cooled, thin-layered powder was produced. However, different from Example 1, the temperature was retained at 1020° C. Then, the rapidly cooled, thin-layered powder was heated at 1500° C. for 1 hour in an atmosphere of a mixed gas of 1 atm consisting of Ar, H₂ and CH₄ (60/20/20).

X-ray diffraction and SEM observation showed that, surprisingly, the synthesized powder obtained had a crystal structure of WC type and an average particle size of 0.3 μm.

EXAMPLE 9

A TiH₂ powder put in a carbon container was placed in an atmosphere of BCl₃ gas having a reduced pressure of 6 Torr. High-frequency heating was externally applied to heat the carbon container and the TiH₂ powder to 900° C. and also to convert the BCl₃ gas into a plasma condition. This state was retained for 1 hour, by which boronization treatment was allowed to proceed sufficiently.

It was revealed that the synthesized powder had an average particle size of 0.3 μm and its boron content was 31.1% by weight. X-ray diffraction showed that the powder was TiB.

EXAMPLE 10

A TiH₂ powder put in a carbon container was placed in an atmosphere of N₂ gas having a reduced pressure of 6 Torr. High-frequency heating was externally applied to heat the carbon container and the TiH₂ powder to 1100° C. and also to convert the N₂ gas into a plasma condition. This state was retained for 1 hour, by which nitriding treatment was allowed to proceed sufficiently.

It was revealed that the synthesized powder had an average particle size of 0.2 μm and its nitrogen content was 22.3% by weight. X-ray diffraction showed that the powder was TiN.

EXAMPLE 11

A TiH₂ powder put in a carbon container was placed in an atmosphere of N₂+methane gas (N₂:methane=1:2) having a reduced pressure of 6 Torr. High-frequency heating was externally applied to heat the carbon container and the TiH₂ powder to 1000° C. and also to convert the N₂+methane gas into a plasma condition. This state was retained for 1 hour, by which carbonization-nitriding treatment was allowed to proceed sufficiently.

It was revealed that the synthesized powder had an average particle size of 0.2 μm. X-ray diffraction showed that the powder was TiCN.

What is claimed is:

1. A process for producing non-oxide powders, which comprises rapidly cooling a molten oxide to produce a brittle oxide material, reducing the oxide material in a reducing atmosphere, and after or concurrently with the reduction, subjecting the resulting reduced powder to heat treatment in a carbon-containing atmosphere, a nitrogen-containing atmosphere, a carbon and nitrogen-containing atmosphere, or a boron-containing atmosphere to obtain non-oxide powder of a carbide, a nitride, a carbide/nitride or a boride, respectively.

2. The process according to claim 1 wherein the oxide is metal oxide.

3. The process according to claim 2, wherein the metal oxide comprises WO₃ or WO₃ admixed with at least one oxide of a metal selected from the group consisting of V, Cr and Mo.

4. The process according to any one of claims 1 to 3 wherein the atmosphere is put into a plasma condition during the heat treatment by externally adding an electric energy.

5. The process according to claim 1 wherein a WC powder is obtained by using a WO₃ powder as the oxide, by using a reducing and carbon-containing atmosphere comprising H₂ and CH₄ at a ratio of 1/10 to 100/1, and by heating the WO₃ powder at 800° C. or higher.

6. The process according to claim 1 wherein a WC powder is obtained by using as the oxide a brittle material obtained by gushing melted WO₃ onto a cooling body and rapidly cooling the WO₃ at a cooling rate of $10^{4°}$ C./sec or faster, by using a reducing and carbon-containing atmosphere comprising H₂ and CH₄ at a ratio of 1/10 to 100/1, and by heating the WO₃ powder at 800° C. or higher.

7. The process according to claim 1 wherein the heat treatment is carried out in an atmosphere having a reduced pressure of 0.1 to 20 Torr which is put in a plasma condition with the external addition of an electric energy.

8. The process according to claim 1 wherein a WC powder is obtained by using as the oxide a brittle material obtained by gushing melted WO₃ onto a cooling body and rapidly cooling the WO₃ at a cooling rate of $10^{4°}$ C./sec or faster, and by heating a mixture of the brittle material and carbon powder at a temperature of 1400° to 1700° C. firstly in N₂ atmosphere and then in H₂ atmosphere.

9. The process according to claim 1 wherein a WC powder is obtained by using as the oxide a brittle material obtained by gushing melted WO₃ onto a cooling body and rapidly cooling the WO₃ at a cooling rate of $10^{4°}$ C./sec or faster, and by reducing this material at 800° C. or higher in H₂ atmosphere and then carbonizing at the same temperature level in CH₄ atmosphere.

10. The process according to claim 1 wherein a powder of a solid solution comprising tungsten carbide and chromium carbide is obtained by using as the oxide a brittle material obtained by gushing a melted oxide comprising WO₃ and Cr₂O₃, a chromium compound or metallic chromium onto a cooling body and rapidly cooling the oxide at a cooling rate of $10^{4°}$ C./sec or faster, and by heating the brittle material at 1100° C. or higher in a reducing and carbon-containing atmosphere containing $H_2$ and $CH_4$ at a ratio of 1/10 to 100/1.

11. The process according to claim 1 wherein a solid solution powder comprising tungsten carbide and vanadium carbide is obtained by using as the oxide a brittle material obtained by gushing a melted oxide comprising $WO_3$ and $V_2O_5$, a vanadium compound or metallic vanadium onto a cooling body and rapidly cooling the oxide at a cooling rate of $10^{4°}$ C./sec or faster, and by heating the brittle material at 1100° C. or higher in a reducing and carbon-containing atmosphere containing $H_2$ and $CH_4$ at a ratio of 1/10 to 100/1.

12. The process according to claim 1 wherein a solid solution powder comprising tungsten carbide and molybdenum carbide is obtained by using as the oxide a brittle material obtained by gushing a melted oxide comprising $WO_3$ and $MoO_3$, a molybdenum compound or metallic molybdenum onto a cooling body and rapidly cooling the oxide at a cooling rate of $10^{4°}$ C./sec or faster, and by heating the brittle material at 1400° C. or higher in a reducing and carbon-containing atmosphere containing $H_2$ and $CH_4$ at a ratio of 1/10 to 100/1.

13. The process according to claim 10, 11 or 12 wherein the heating is conducted in an atmosphere having a reduced pressure of 0.1 to 12 Torr which is put in a plasma condition with the external addition of an electric energy.

14. The process according to claim 1, wherein said non-oxide powder has a particle size of not more than 1.0 μm.

15. The process according to claim 1, further comprising melting an oxide powder to form said molten oxide, forming a thin layer of the brittle oxide material during rapid cooling of said molten oxide, and subjecting said thin layer to said reducing atmosphere.

* * * * *